United States Patent
Kosuge

(10) Patent No.: US 8,126,018 B2
(45) Date of Patent: Feb. 28, 2012

(54) DECODING CIRCUIT

(75) Inventor: Tetsuo Kosuge, Gunma-ken (JP)

(73) Assignees: Sanyo Electric Co., Ltd., Osaka (JP); Sanyo Semiconductor Co., Ltd., Gunma (JP)

( * ) Notice: Subject to any disclaimer, the term of this patent is extended or adjusted under 35 U.S.C. 154(b) by 1126 days.

(21) Appl. No.: 11/946,635

(22) Filed: Nov. 28, 2007

(65) Prior Publication Data

US 2008/0253446 A1 Oct. 16, 2008

(30) Foreign Application Priority Data

Nov. 30, 2006 (JP) ................................. 2006-322833

(51) Int. Cl.
*H04J 1/00* (2006.01)
*H04N 7/12* (2006.01)

(52) U.S. Cl. .................... 370/485; 375/240.01

(58) Field of Classification Search ........................ None
See application file for complete search history.

(56) References Cited

U.S. PATENT DOCUMENTS

| 6,104,752 A * | 8/2000 | Yamagishi | 375/240 |
| 7,020,205 B1 * | 3/2006 | Beyers et al. | 375/240.26 |
| 7,835,475 B2 * | 11/2010 | Adachi | 375/343 |

FOREIGN PATENT DOCUMENTS

JP 2005020340 A * 1/2005

OTHER PUBLICATIONS

Kameyama, Wataru et al. "MPEG-1/MPEG-2/MPEG-4 Digital Broadcasting Textbook (vol. I)"; IDS Japan, pp. 75-88 (8 pages).

* cited by examiner

*Primary Examiner* — Hassan Phillips
*Assistant Examiner* — Hicham Foud
(74) *Attorney, Agent, or Firm* — Osha Liang LLP

(57) ABSTRACT

A data storage/reading circuit successively stores frame data in a data storage memory. A start address storage unit memorizes a start address of non-reference frame data stored in the data storage memory. A decoding circuit starts a decoding operation by reading the data from the start address of already stored non-reference frame data, based on a decoding start command.

3 Claims, 3 Drawing Sheets

| IDR Picture (Intra Slice) (1) DECODABLE INDEPENDENTLY | NIDR Picture (Predicted Slice) (2) (DATA (1) IS REQUIRED FOR DECODING THE DATA) | NIDR Picture (Bi-predictive Slice) (3) (DATA (1) AND (2) ARE REQUIRED FOR DECODING THE DATA) | NIDR Picture (Bi-predictive Slice) (4) (DATA (1) AND (2) ARE REQUIRED FOR DECODING THE DATA) |

| DECODING ORDER | 1 | 2 | 3 | 4 |
|---|---|---|---|---|
| DISPLAY ORDER | 1 | 4 | 2 | 3 |
| DECODING READY STATE? | OK | NG | NG | NG |

Fig. 1

DECODING CIRCUIT

CROSS-REFERENCE TO RELATED APPLICATION

This application claims priority to Japanese Patent Application No. 2006-322833, filed on Nov. 30, 2006.

BACKGROUND OF THE INVENTION

1. Field of the Invention

The present invention relates to a decoding circuit which operates to decode coded video data including non-reference frame data (i.e., frame data that do not refer to other frame data) and reference frame data (i.e., frame data that refer to other frame data).

2. Description of the Related Art

In Japan, the digital TV broadcasting service for mobile communications (generally referred to as "One segment broadcasting" or "One Seg") has been available since April 2006. The apparatus, such as an automotive vehicle TV, can receive one-segment broadcasting in weak electric field areas and also receive 12-segment broadcasting (Hi-Vision broadcasting) in strong electric field areas, as discussed in Wataru KAMEYAMA et al: "MPEG-1/MPEG-2/MPEG-4 Digital Broadcasting Textbook (Vol. I)", IDG Japan, pp. 75 to 88.

In general, the apparatus takes a relatively long time to switch from the display of the 12-segment broadcasting to the display of the one-segment broadcasting. This is because the interval between decode reference pictures (IDR pictures) for the one-segment broadcasting is long compared to that for the 12-segment broadcasting. Therefore, there is a significant waiting time before the next decode start reference picture is received.

As a method for quickly starting a display of data, it may be useful to decode both one-segment data and 12-segment data concurrently and switch a picture to be displayed depending on the situation. However, this method is disadvantageous in electric power consumption and the bandwidth of Synchronous Dynamic Random Access Memory (SDRAM), compared to a switching-type decoder.

SUMMARY OF THE INVENTION

According to an aspect of the present invention, a decoding circuit can memorize a storage position of a reference frame in a memory from which the decoding circuit can start a decoding operation. Therefore, the decoding circuit can immediately start reading memory data from the reference frame corresponding to the memorized position. Thus, the decoding circuit can reduce an inoperable (dormant) period of the apparatus and promptly start a screen display of decoded data.

BRIEF DESCRIPTION OF THE DRAWINGS

Exemplary embodiments of the present invention will be described in detail based on the following figures, wherein:

FIG. 1 illustrates a frame structure of a coded data bit stream according to an embodiment;

DESCRIPTION OF PREFERRED EMBODIMENTS

A decoding circuit according to an exemplary embodiment of the present invention is described with reference to the attached drawings.

FIG. 1 illustrates a frame structure of general bit stream data according to the H.264 standard. In addition, 12-segment broadcasting uses MPEG coding system, on the other hand, one-segment broadcasting uses H.264 coding system.

The H.264 coding system can process a reference picture (IDR picture) and a non-reference picture (NIDR picture). The reference picture (IDR picture) includes picture data from which an original image is independently decodable. On the other hand, no image is decodable from the non-reference picture (NIDR picture) unless the non-reference picture is added to preceding or preceding/succeeding picture data and subjected to expansion processing. Therefore, the non-reference picture cannot be decoded in a state where the preceding or preceding/succeeding picture data have not been decoded.

Figure 2:
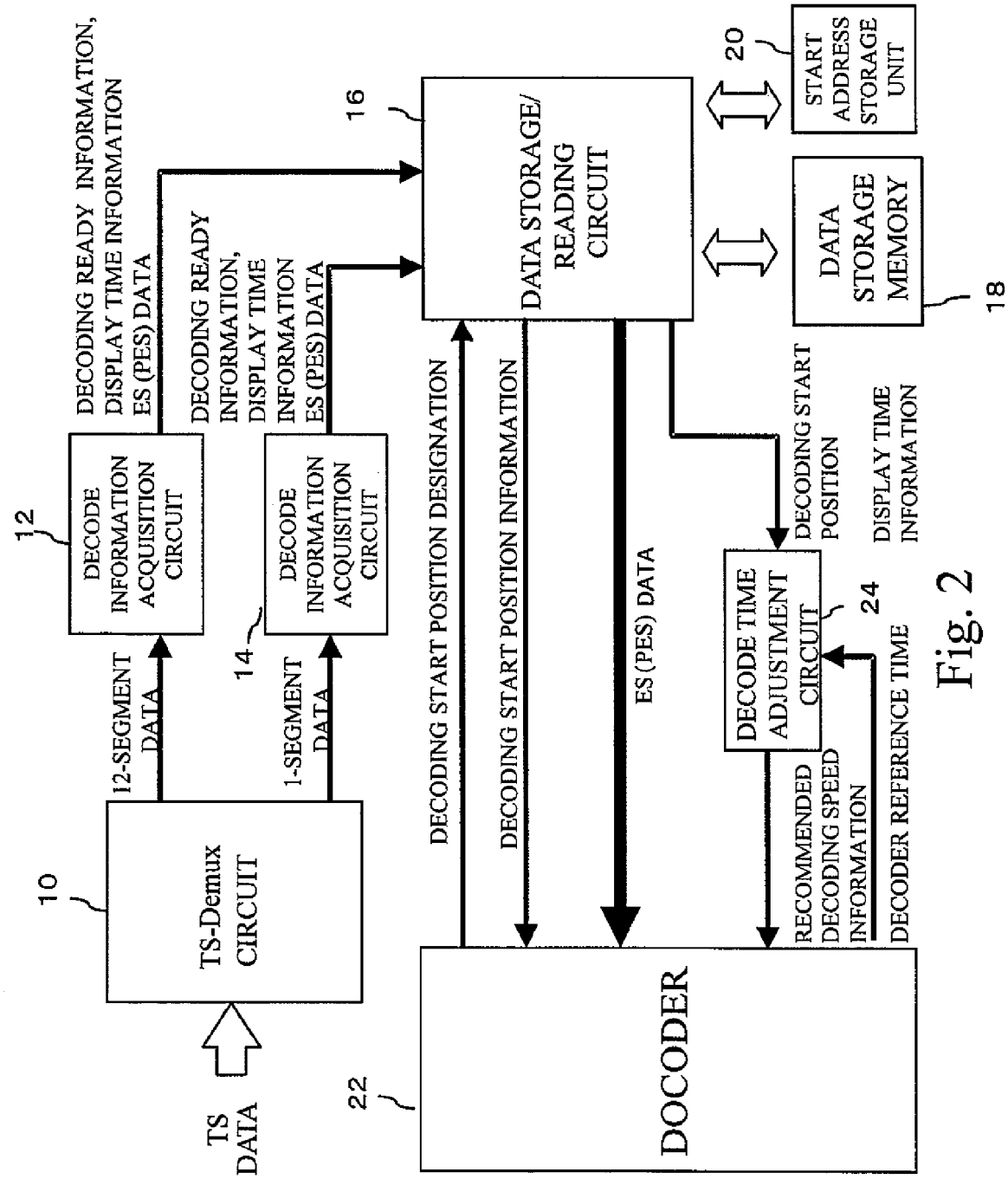
FIG. 2 is a block diagram illustrating a decoding circuit according to an embodiment.

FIG. 2 illustrates an example of the decoding circuit according to an embodiment, including a Transport Stream Demultiplex (TS-Demux) circuit 10 operable to receive TS data (i.e., coded video data). The MPEG2-Transport Stream (TS) can transmit a packet of video, sound, and other data formatted according to MPEG2, and is preferably used for digital data transmission, such as BS digital broadcasting and terrestrial digital broadcasting.

The TS Demux circuit 10 separates the received TS data into 12-segment data (TS data) and one-segment data (TS data) based on a PID number involved in the header of the TS data. A decode information acquisition circuit 12 receives the 12-segment data from the TS Demux circuit 10. A decode information acquisition circuit 14 receives the one-segment data from the TS Demux circuit 10. The decode information acquisition circuits 12 and 14 can convert the 12-segment data or the one-segment data into <display time information+ES data> or <PES data> and supply the converted data to a data storage/reading circuit 16.

The decode information acquisition circuits 12 and 14 can monitor the converted data and detect start data, such as a PES header code (0x0001BC to 0x0001FF) representing a start position of the reference frame or an IDR picture start code (0x000165) according to the H.264. If any start data is detected, the decode information acquisition circuits 12 and 14 determine that decoding of data starts from this position and notify the data storage/reading circuit 16 of this information. The decode information acquisition circuits 12 and 14 can also transmit the detected start data information to a decoder 22.

The data storage/reading circuit 16 successively stores the data received from the decode information acquisition circuits 12 and 14 into a data storage memory 18. If the data storage/reading circuit 16 determines that regeneration of the data is feasible from a storage position corresponding to the start data information obtained by the decode information acquisition circuits 12 and 14, the data storage/reading circuit 16 transmits information relating to the storage position (i.e., a start address of the reference frame) to the decoder 22. Furthermore, the data storage/reading circuit 16 stores the detected start address into a start address storage unit 20.

Namely, the data storage memory 18 successively stores one-segment data and 12-segment data. The start address storage unit 20 stores a start address of a reference picture (IDR) for one-segment data.

The data storage/reading circuit 16 can select an arbitrary decodable position and can read the data from the selected position. The decoder 22 selects a picture position where a decoding operation can be started in response to a regeneration start command. The decoder 22 instructs the data storage/reading circuit 16 to read frame data from a designated position of the data storage memory 18.

The data storage/reading circuit 16 successively reads the data (frame data) temporarily stored in the data storage memory 18, from the address instructed by the decoder 22, and supplies the read data to the decoder 22. Then, the decoder 2 generates decoded data used for a screen display.

The decoding circuit according to this embodiment includes a decode time adjustment circuit 24. The decode time adjustment circuit 24 controls the timing of a decoding operation performed by the decoder 22, based on a difference between the present time and the display time information stored in the frame data at the time the decoding operation starts.

More specifically, the decode time adjustment circuit 24 instructs a recommended decoding speed to the decoder 22. The decoder 22 adjusts the speed of a decoding operation according to the command received from the decode time adjustment circuit 24. Thus, the time of data decoded from the decoder 22 gradually approaches the present time and completely accords with the present time when a predetermined time has elapsed.

In this manner, the decode time adjustment circuit 24 can determine a recommended decoding speed to reduce the difference between the display time and the decode reference time. Thus, the decoding circuit can perform a smooth and seamless regeneration of the data.

The above-described embodiment can reduce a waiting time for data regeneration even if there is a long interval between reference pictures.

The decoding circuit according to this embodiment performs an operation for switching from the decoding of 12-segment data to the decoding of one-segment data.

The data storage/reading circuit 16 successively receives 12-segment data via the decode information acquisition circuit 12 and stores the received 12-segment data into the data storage memory 18. Then, the data storage/reading circuit 16 successively supplies frame data to the decoder 22 in a codable order. The decoder 22 successively decodes the frame data.

Meanwhile, the data storage/reading circuit 16 successively receives one-segment data via the decode information acquisition circuit 14 and stores the received one-segment data into the data storage memory 18. In this case, the data storage/reading circuit 16 successively stores a start address of reference frame data to the start address storage unit 20.

The storage amount of one-segment data in the data storage memory 18 is set to a predetermined value so that at least one reference frame data is constantly stored. The one-segment data has a bit rate of 200 kbs and therefore reference frame data is transmitted every five seconds. Thus, the data storage memory 18 is required to store one-segment data of five seconds.

Figure 3:
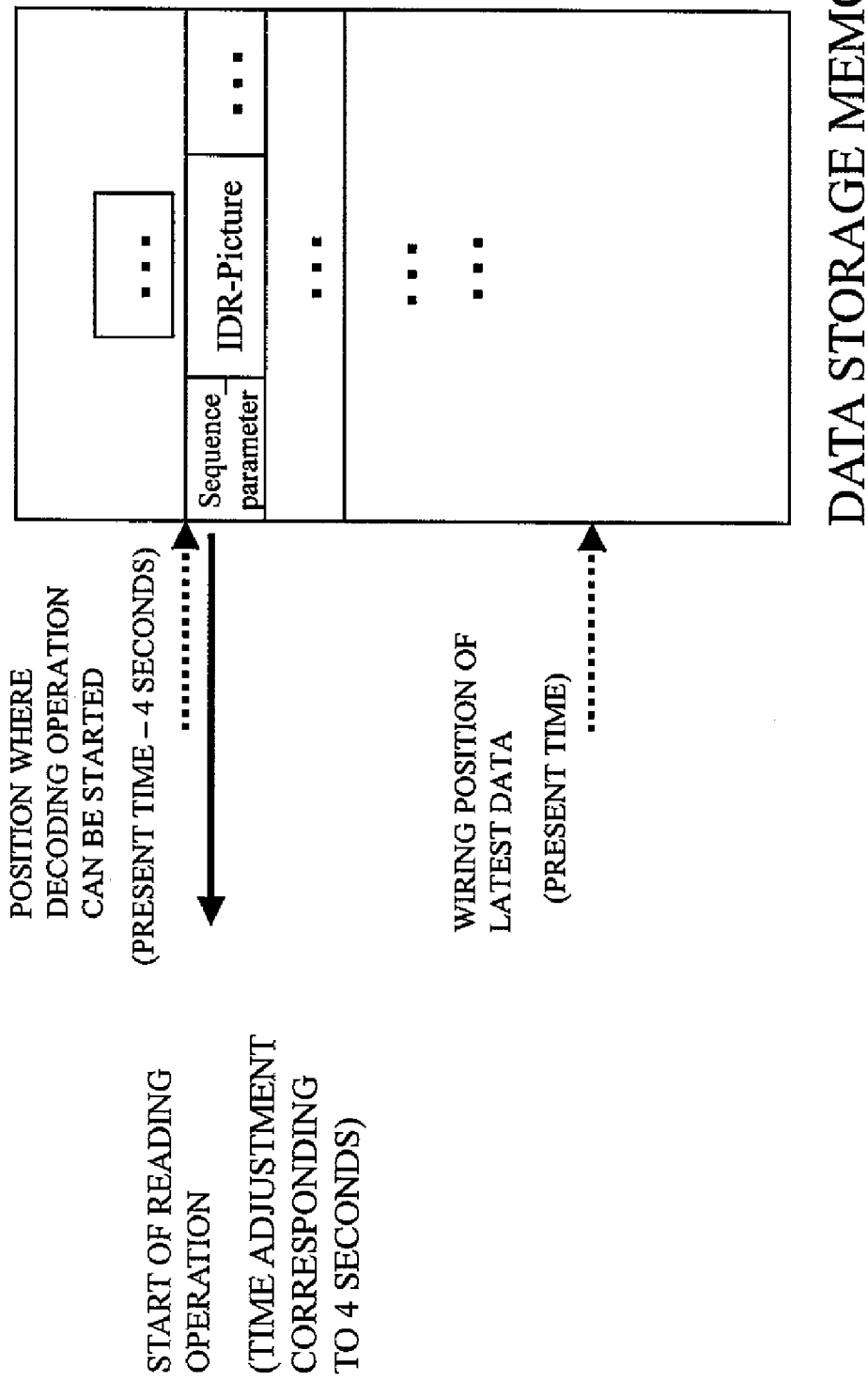
FIG. 3 illustrates a data storage state of a data storage memory according to an embodiment.

FIG. 3 illustrates a storage state of one-segment data in the data storage memory 18 that successively stores the supplied one-segment frame data. In this case, the start address storage unit 20 stores a start address of a reference frame. According to the example of FIG. 3, an address corresponding to a position where a decoding operation can be started is a start address of the reference frame. Furthermore, an address corresponding to a writing position of latest data is a start address of frame data to be presently displayed.

If a one-segment data decoding command (i.e., a command instructing decoding of one-segment data) is received from an external microcomputer, i.e., when a switching from the 12-segment display to the one-segment display is performed, the data storage/reading circuit 16 changes the reading data from 12-segment data to one-segment data. In this case, the data storage/reading circuit 16 refers to the information stored in the start address storage unit 20 and starts reading the data from the start address of the reference frame, as illustrated in FIG. 3. The data storage/reading circuit 16 transmits the readout data to the decoder 22. The frame data of the reference frame is the data decodable by itself. Therefore, the decoder 22 can immediately start a decoding operation. Accordingly, the apparatus can quickly realize a screen display.

The reference frame being first read out by the data storage/reading circuit 16 is the data having being processed earlier, e.g., four seconds earlier according to the example of FIG. 3, than the frame data of the present time. Therefore, if the data storage/reading circuit 16 reads the data from the data storage memory 18 according to a conventional method, the decoded data generated from the decoder 22 are constantly delayed by a predetermined time (four seconds).

However, according to this embodiment, the decode time adjustment circuit 24 instructs the recommended decoding speed information to the decoder 22. The decoder 22 adjusts the decoding speed so that the display time of frame data decoded from the decoder 22 gradually approaches the present time and can finally accord with the present time.

In this case, the decoder 22 can adjust the display time by changing the number of frames per unit time, or by thinning out a frame to be decoded at appropriate intervals. For example, the decoder 22 can perform a decoding operation to realize a fast-forward display at the speed of 1.2 times. In this case, the time when the display time of frame data decoded from the decoder 22 can finally accord with the present time is dependent on the time difference at the beginning of the decoding speed adjustment. On the other hand, the decoder 22 can determine the fast-forward speed so that the display time of frame data decoded from the decoder 22 completely accords with the present time when a predetermined time (e.g., one minute) has elapsed.

If the 12-segment data are not used for a screen display, it is useful to store a predetermined amount of 12-segment data into the data storage memory 18 and store a start address of the reference frame into the start address storage unit 20. The decoder 22 can promptly start a decoding operation in response to a decoding start command of 12-segment data.

The data storage memory 18 can be configured to store the data required for a display (e.g., size information and display time) in an area separate from the area for the ES (coded data). This is effective to reduce the amount of data not used for a decoding operation (e.g., part of PES data). As the already stored data is available, if any necessary information (e.g., size information) is not involved, additionally writing of only the required information becomes feasible.

The decoder 22 selects a picture position where a decoding operation can be started in response to a regeneration start command. The decoder 22 instructs the data storage/reading circuit 16 to read frame data from a designated position of the data storage memory 18. In this case, the data storage/reading circuit 16 can load any other data (e.g., size information or display time) stored in another area of the data storage memory 18 into the decoder 22.

In a power saving mode, the apparatus can activate only a limited number of components that are necessary to store TS data into the data storage memory 18. Since other components are in a deactivated state, the apparatus can speedily resume the ordinary operation in response to a command for terminating the power saving mode.

What is claimed is:

1. A decoding circuit operable to decode coded video data including non-reference frame data and reference frame data, comprising:
   a data storage memory configured to successively store the coded video data of each frame; and
   a start address storage unit configured to memorize a start address of non-reference frame data stored in the data storage memory,
   wherein the decoding circuit performs a decoding operation in response to a decoding start command, so that reading of the data initiates from the start address of already stored non-reference frame data;
   wherein the coded video data includes 12-segment frame data and one-segment frame data;
   wherein, when the decoding circuit is performing a decoding operation for the 12-segment frame data, the data storage memory stores the one-segment frame data and the start address storage unit memorizes a start address of one-segment non-reference frame; and
   wherein the decoding circuit starts a decoding operation for the one-segment data in response to a one-segment data decoding command so that reading of the data initiates from the start address of the already stored non-reference frame data.

2. The decoding circuit according to claim 1, wherein the decoding circuit detects display time information relating to the read non-reference frame data in response to the decoding start command, and adjusts a decoding speed to decease a difference between the display time and the present time.

3. The decoding circuit according to claim 1, wherein the reading of the data initiated from the start address by the decoding circuit is delayed from the present time such that the data displayed using the decoding circuit is initially delayed from the present time.

* * * * *